United States Patent
Lindeberg et al.

(10) Patent No.: US 8,148,914 B2
(45) Date of Patent: Apr. 3, 2012

(54) DYNAMIC POWER SAVING PULSE WIDTH MODULATED LED DRIVER CIRCUIT

(75) Inventors: Jonne J. Sebastian Lindeberg, Helsinki (FI); Tri Cao Nguyen, Garland, TX (US); Suribhotla Rajasekhar, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 427 days.

(21) Appl. No.: 12/534,954

(22) Filed: Aug. 4, 2009

(65) Prior Publication Data

US 2010/0164396 A1 Jul. 1, 2010

Related U.S. Application Data

(60) Provisional application No. 61/141,804, filed on Dec. 31, 2008.

(51) Int. Cl.
*H05B 37/02* (2006.01)

(52) U.S. Cl. .............................. 315/291; 315/307
(58) Field of Classification Search .......... 315/194, 315/291, 294, 307–311
See application file for complete search history.

(56) References Cited

U.S. PATENT DOCUMENTS

| | | | |
|---|---|---|---|
| 2009/0009096 A1* | 1/2009 | Mojarradi et al. | 315/194 |
| 2009/0273288 A1* | 11/2009 | Zhao et al. | 315/185 R |
| 2010/0264837 A1* | 10/2010 | Zhao | 315/189 |
| 2011/0204817 A1* | 8/2011 | Han | 315/294 |

* cited by examiner

*Primary Examiner* — Don Le
(74) *Attorney, Agent, or Firm* — William B. Kempler; Wade J. Brady III; Frederick J. Telecky, Jr.

(57) ABSTRACT

In accordance with an aspect of the present invention, an LED driving circuit includes a digital-to-analog converter and a driving portion. The circuit is operable to turn off the digital-to-analog converter at times when the driving portion is not providing a high signal. As such the digital-to-analog converter will waste less energy.

20 Claims, 8 Drawing Sheets

DYNAMIC POWER SAVING PULSE WIDTH MODULATED LED DRIVER CIRCUIT

The present application claims benefit under 35 U.S.C. §119(e) to U.S. provisional patent application 61/141,804, filed Dec. 31, 2008, the entire disclosure of which is incorporated herein by reference.

BACKGROUND

Conventional Pulse Width Modulated (PWM) Light Emitting Diode (LED) drivers suffer from high quiescent current, which is the standing current that flows in a circuit when the signal is not applied. Quiescent current is necessary to maintain accurate driving current when the PWM pulse is high. The tradeoff of high quiescent current versus accurate output LED current exists regardless of the circuit architecture. In general, high quiescent current means accurate output LED current, and low quiescent current means coarse output LED current.

Figure 1:
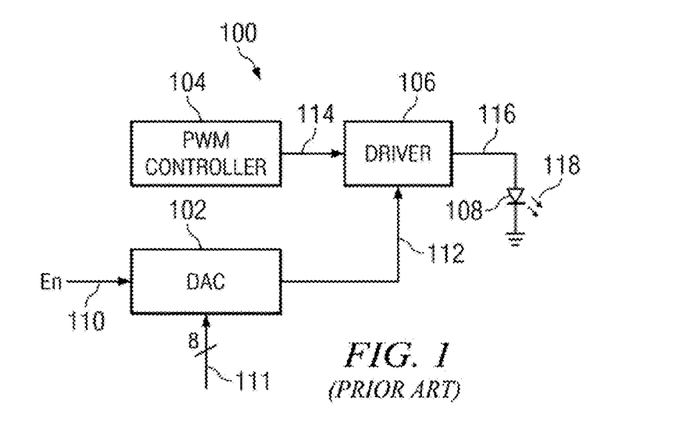
FIG. 1 illustrates the basic topology of an LED driver.

FIG. 1 illustrates a basic block diagram for a conventional LED driver circuit 100 for driving an LED 108. In FIG. 1, driving circuit 100 includes a digital to analog converter (DAC) 102, a PWM controller 104, and a driver 106. A digital input signal 111 is converted to an analog signal 112 by DAC 102 when enable signal 110 is high. In an example embodiment, digital input signal 111 is an 8-bit signal. The duty cycle, or pulse width, of analog signal 112 is set by PWM controller 104, via a PWM signal 114. Driver 106 amplifies analog signal 112 as modulated by PWM signal 114 and outputs amplified signal 116 to LED 108. LED 108 emits light 118 corresponding to amplified signal 116.

Figure 2:
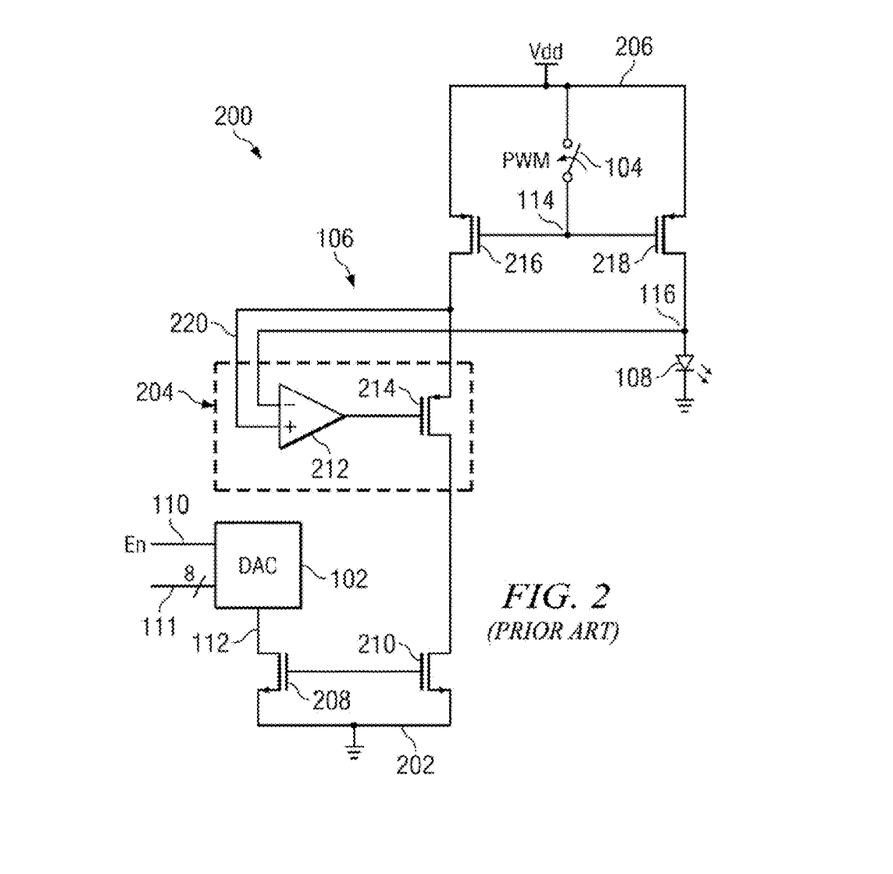
FIG. 2 illustrates the architecture of a sample PWM LED driver.

FIG. 2 is a more detailed example of a conventional LED driver circuit 200 for driving LED 108. In FIG. 2, circuit 200 includes DAC 102, a current mirror 202, a current mirror 206, a voltage controller 204, and switch 104. Current mirror 202 includes two N-channel FETs 208 and 210. Current mirror 206 includes two P-channel FETs 216 and 218. Voltage controller 204 includes a cascade amplifier 212 and a P-channel FET 214.

In operation, DAC 102 accepts digital input signal 111 and outputs analog signal 112. DAC outputs analog signal 112 to control the current through LED 108 via current mirror 202 and current mirror 206. Voltage controller 204 provides a feedback mechanism to stabilize amplified signal 116 by adjusting the control voltage to the gate of FET 214, which ultimately minimizes the output differentiation between P-channel FETs 216 and 218. Specifically, a signal 220 from the drain of P-channel FET 216 and amplified signal 116 from the drain of P-channel FET 218 are supplied to inputs of cascade amplifier 212. Cascade amplifier 212 amplifies the difference between signal 220 and amplified signal 116. The amplified difference is used to drive the gate of FET 214. When amplified signal 116 becomes much greater than signal 220 and the amplified difference is sufficiently large, FET 214 turns on, thereby drawing more current through P-channel FET 216, thus increasing signal 220. As signal 220 increases due to the increased current pull from FET 214, amplified signal 116 decreases. At this point, the now-increased signal 220 and now-decreased amplified signal 116 are fed into cascade amplifier 212. Cascade amplifier 212 then amplifies the difference between now-increased signal 220 and now-decreased amplified signal 116. The amplified difference between now-increased signal 220 and now-decreased amplified signal 116 is insufficient to keep FET 214 on, so FET 214 again shuts down. In this manner, since terminal 116 is the input of LED 108, voltage controller 204 actually works as a feedback controller to monitor LED current and maintain the accuracy of the driver circuit.

Figure 3:
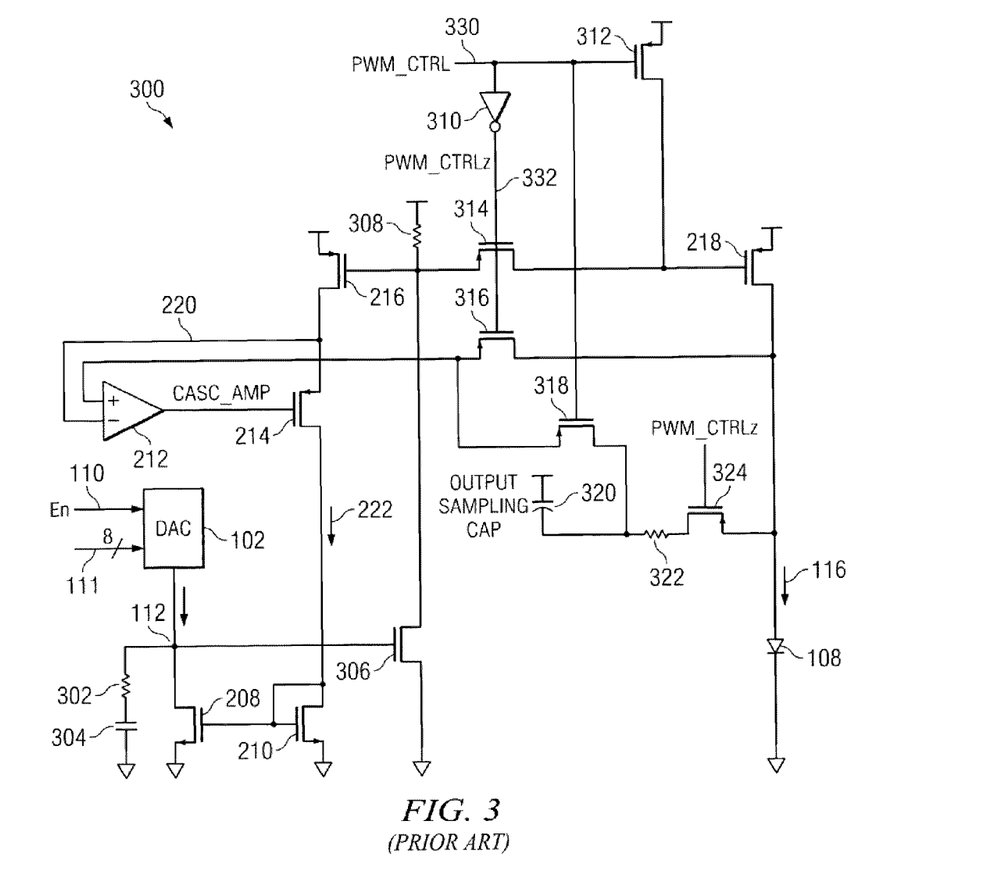
FIG. 3 illustrates detailed schematic of an exemplary conventional LED driver circuit.

FIG. 3 is an even more detailed schematic of an exemplary conventional LED driver circuit 300 for driving LED 108, wherein switch 104 of FIG. 2 is described in greater detail. Circuit 300 includes DAC 102, current mirror 202, current mirror 206, and voltage controller 204. In addition, circuit 300 includes a resistor 302, a resistor 308, a resistor 322, a filter capacitor 304, an output sampling capacitor 320, a N-channel FET 306, P-channel FETs 312, 314, 316, 318, and 324, and a NOT gate 310.

In operation, whenever amplified signal 116 flows through LED 108, amplified signal 116 will additionally feed back to the positive input terminal of cascade amplifier 212 through FET 324, resistor 322, and FET 318. Analog signal 112 from DAC 102 drives the gate of FET 306, which in turn controls the gate of FET 216. Signal 220 from FET 216 is fed back to the negative terminal of cascade amplifier 212. As discussed above, the voltage controller constructed by cascade amplifier 212 and FET 214 maintains a substantial equality between signal 220 and amplified signal 116. With such feedback control, amplified signal 116 remains substantially constant, which results in the brightness of LED 108 remaining substantially constant.

In circuit 300, FETs 208, 210, 306, and 216 act as a "super current mirror" to provide more accurate current control for the circuit. When DAC 102 is on, analog signal 112 drives the gate of FET 306, which drives the gate of FET 216, which in turn controls signal 220 through FET 210. The change signal 220 will be mirrored to analog signal 112 from DAC 102.

FET 312 acts as a PWM signal switch corresponding to switch 104 in FIG. 2. FET 314 acts as a switch between FET 216 and 218. FET 316 acts as a switch between LED 108 and positive input of cascade amplifier 212. The purpose of FETs 312, 314, 316, 318 and 324 are to provide a feedback loop to voltage controller 204.

In operation, when a pulse width modulation control signal 330 is high, FET 312 turns OFF, which drives the gates of FET 218 and FET 216 to low. As a result, FET 218 is turned ON and there is a current flow into LED 108. At the same time, NOT gate 310 inverts high pulse width modulation control signal 330 and outputs a low signal, which turns FET 314 and FET 316 ON. FET 314 and FET 316 then provide the feedback loops to the positive terminal and negative terminal of cascade amplifier 212, respectively. Amplified signal 116 is therefore monitored and controlled.

Further, when pulse width modulation control signal 330 is low, FET 312 turns OFF, which turns OFF FET 218. In this situation, no current flows into LED 108. At the same time, NOT gate 310 turns OFF FET 314 and turns OFF FET 316. As a result, no feedback is provided to the positive terminal and negative terminal of cascade amplifier 212. In this situation, LED current 116 not monitored and controlled.

Energy inefficiency is problem associated with the conventional LED driver circuits discussed above. Specifically, in each of circuits 100, 200 and 300, the high quiescent current wastes significant power from battery. For example, referring to circuit 300, since DAC 102 constantly ON, analog signal 112 and signal 222 constantly flow through FET 208 and FET 210, respectively, to ground. These currents flow even when LED 108 is OFF. In other words, the conventional LED driver circuit keeps drawing power regardless of the status of the LED. The energy inefficiency of the conventional LED driver circuits discussed above will be further described with reference to FIG. 4 and FIG. 5 below.

Figure 4:
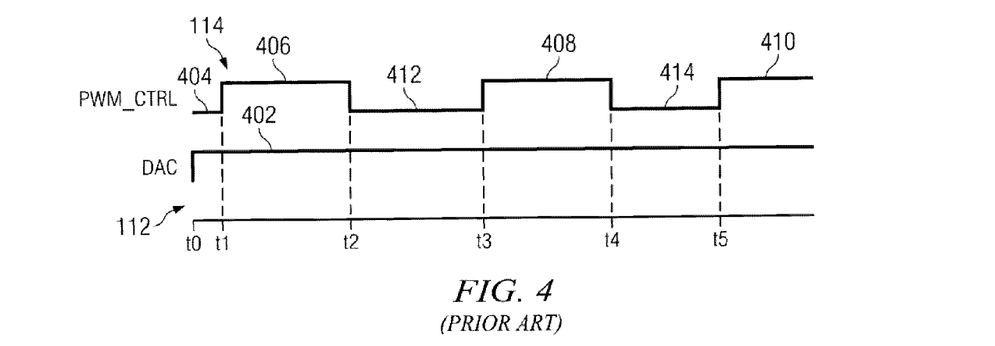
FIG. 4 illustrates waveform of a PWM control signal with 50% duty cycle versus the state of the DAC.

FIG. 4 illustrates a waveform of PWM signal 114 with 50% duty cycle versus analog signal 112 from DAC 102 indicated as waveform 402 in a conventional LED driving circuit. In this example, PMW signal 114 includes a low pulse 404 at time $t_0$-$t_1$, a low pulse 412 at time $t_2$-$t_3$, and a low pulse 414 at time $t_4$-$t_5$, each of which represents LED 108 being in an OFF state. PMW signal 114 additionally includes a high pulse 406 at time $t_1$-$t_2$, and a high pulse 408 at time $t_3$-$t_4$, each of which represents LED 108 being in an ON state. However, one can see that waveform 402 is always ON regardless of whether PWM signal 114 is low or high. Referring back to FIG. 3, whenever DAC 102 is ON, analog signal 112 and signal 222 flow into ground through current mirror 202. Consequently, the "all-time" ON DAC 102 wastes unnecessary energy at times when PWM signal 114 is in an OFF state. In the example of FIG. 4, it is clear that at times $t_2$-$t_3$ and $t_4$-$t_5$ analog signal 112 from DAC 102 is sent to ground and the energy corresponding thereto is wasted.

Figure 5:
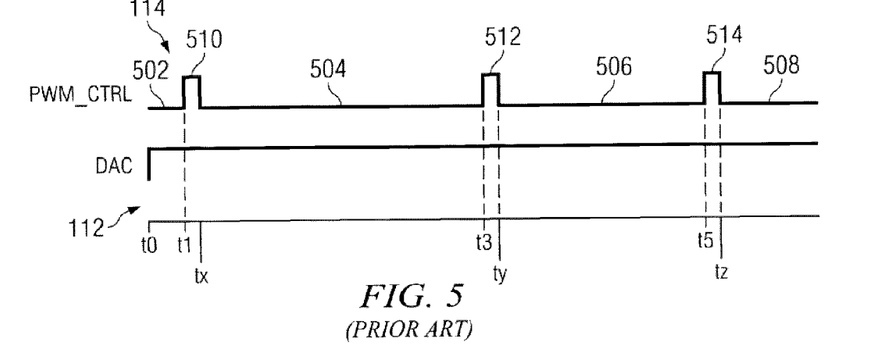
FIG. 5 illustrates waveform of a PWM control signal with $\frac{1}{256}^{th}$ duty cycle versus the state of the DAC.

FIG. 5 illustrates waveform of PWM signal 114 with $\frac{1}{256}$ duty cycle versus analog signal 112 from DAC 102 indicated as waveform 402 in a conventional LED driving circuit. In FIG. 5, it is evident that the conventional LED driver circuit wastes more energy when the PWM control signal has smaller duty cycle. In FIG. 5, PMW signal 114 includes a low pulse 502 at time $t_0$-$t_1$, a low pulse 504 at time $t_x$-$t_3$, a low pulse 506 at time $t_y$-$t_5$ and a low pulse on greater than time $t_z$, each of which represents LED 108 being in an OFF state. PMW signal 114 additionally includes a high pulse 510 at time $t_1$-$t_x$, a high pulse 512 at time $t_3$-$t_y$ and a high pulse 514 at time $t_5$-$t_z$, each of which represents LED 108 being in an ON state. In FIG. 5, the width of high pulses 510, 512, and 514 are very small, which means LED 108 is rarely ON. However, as DAC 102 is always ON, the LED driver circuit wastes energy when LED 108 is OFF. In the example of FIG. 5, it is clear that at times $t_0$-$t_1$, $t_x$-$t_3$, $t_y$-$t_5$ and time greater than $t_z$, analog signal 112 from DAC 102 is sent to ground and the energy corresponding thereto is wasted.

What is needed is a LED driver circuit that is able to improve the power efficiency when the LED is in an OFF state.

BRIEF SUMMARY

It is an object of the present invention to provide an LED driver circuit that maximizes the efficiency by disabling the DAC when the LED is in an OFF state.

In accordance with an aspect of the present invention, a circuit for driving a light source includes an input signal provider portion, an enabling signal providing portion, a digital-to-analog converter and a driving portion. The input signal provider portion can provide a DACzero input signal having a frequency and a DACzero input signal duty cycle including a DACzero input signal high portion and a DACzero input signal low portion. The enabling signal providing portion can provide an enabling signal having the frequency and an enabling signal duty cycle including an enabling signal high portion and an enabling signal low portion. The enabling signal duty cycle is larger than the DACzero input signal duty cycle. The digital-to-analog converter can receive a digital input signal and can generate an analog signal based on the DACzero input signal, the enabling signal and the digital input signal. The driving portion can generate a driving signal to drive the light source, wherein the driving signal is based on the analog signal.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with an aspect of the present invention, in an LED driving circuit that includes a DAC, a PWM controller and a driver, the PWM signal is used to shut down the DAC in certain instances. In some embodiments, the PWM signal itself is not directly used to shut down the DAC because the rising edge of the PWM signal requires some time for startup (linearity requirement). As such, in some embodiments, a DAC_zero signal is used to drive the DAC before the rising edge of the PWM signal so the driver will have sufficiently started up before the PWM pulse arrives. The present invention is ~10 times more efficient in terms of eliminated wasted ground current in most applications. In some cases, there is little justification to use this aspect of the present invention, for example when PWM signal duty cycle is getting closer to 100%. In these cases, the 'DACzeroinig' of the DAC is no longer used. These features will be described in greater detail below with reference to FIGS. 6-12.

Figure 6:
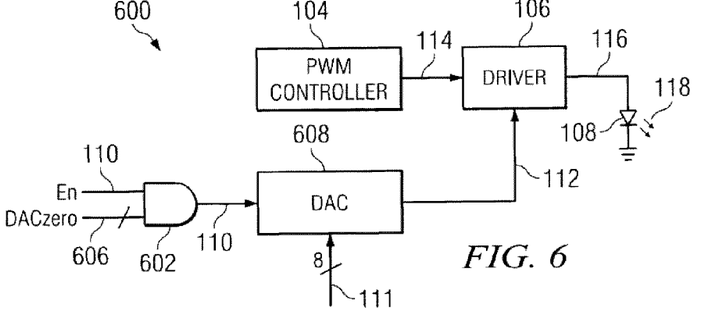
FIG. 6 is a block diagram of an LED driver circuit in accordance with an aspect of the present invention.

FIG. 6 is a block diagram of an example LED driver circuit in accordance with an aspect of the present invention. Circuit 600 is similar to circuit 100 of FIG. 1, yet further includes an AND gate 602. Further, DAC 102 of FIG. 1 is replaced with a modified DAC 608 in FIG. 6. AND gate 602 has an "enable" input 110 and a "DAC_zero" input 606. The output of AND gate 602 is connected to DAC 608. DAC 608 is controlled by the combination of DAC_zero signal 606 and enable signals 110.

In one embodiment, DAC_zero signal 606 is a one-bit control signal that sets the output of DAC 608 to zero. DAC_zero signal 606 also has the capability to override the enable signal 110 if necessary. Circuit 600 operates in a similar manner to the conventional design, for example in FIG. 1, when PWM signal 114 is high. However, when PWM signal 114 is low, for example at low pulses 502, 504, 506 and 508 of FIG. 5, DAC_zero signal 606 is used to disable DAC 608 to reduce the power consumption of circuit 600. As illustrated in FIG. 6, when DAC_zero signal 606 is low, the output of AND gate 602 will correspondingly be low. As such, digital input signal 110 will be low, which in turn will disable DAC 608. More details of this aspect will be discussed below.

Figure 7:
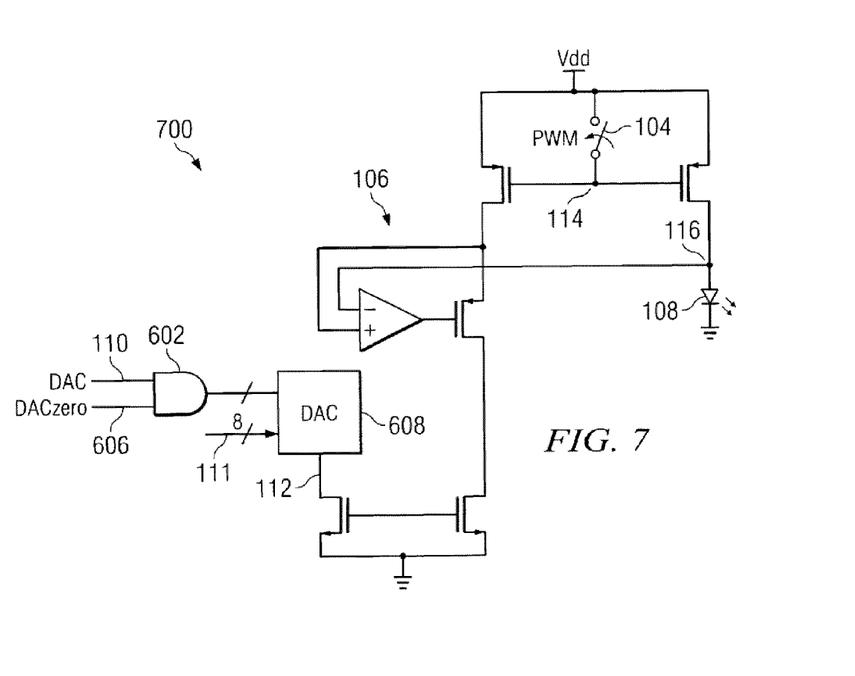
FIG. 7 is a LED driver circuit in accordance with an aspect of the present invention.

FIG. 7 is a more detailed example of a LED driver circuit 700 for driving LED 108 in accordance with an aspect of the present invention. Similar to the embodiment discussed above, circuit 700 is similar to circuit 200 of FIG. 2, yet further includes AND gate 602. Further, DAC 102 of FIG. 2 is replaced with a DAC 608 in FIG. 7. Circuit 700 operates in a similar manner to the conventional design, for example in FIG. 2, when PWM signal 114 is high. However, when PWM signal 114 is low, for example at low pulses 502, 504, 506 and 508 of FIG. 5, DAC_zero signal 606 is used to disable DAC 608 to reduce the power consumption of circuit 700.

Figure 8:
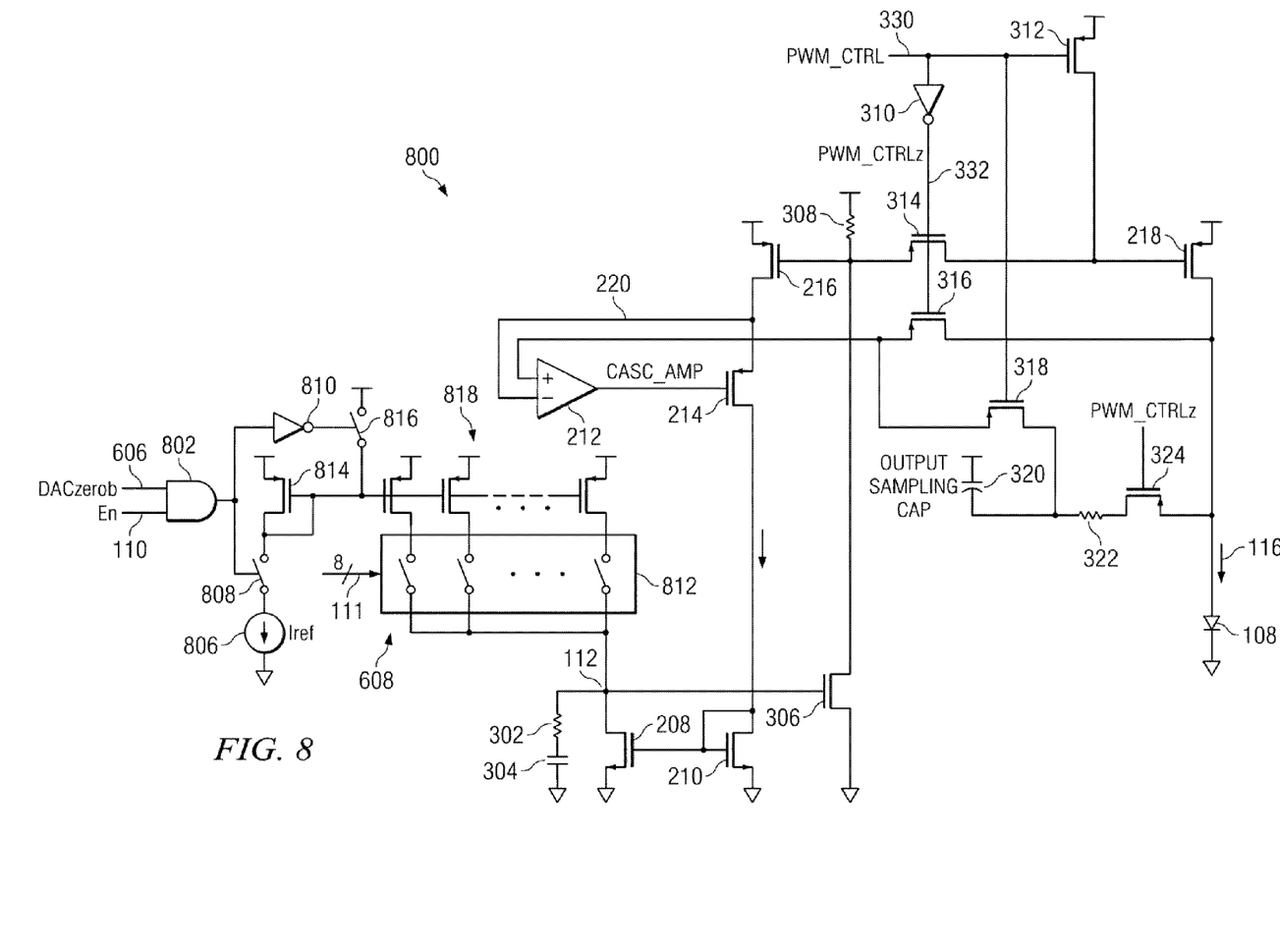
FIG. 8 illustrates a schematic of LED driver circuit in accordance with an aspect of the present invention.

FIG. 8 is an even more detailed schematic of an example LED driver circuit 800 for driving LED 108 in accordance with an aspect of the present invention, wherein switch 104 and DAC 608 of FIG. 7 are described in greater detail. Circuit 800 is similar to circuit 300 of FIG. 3, yet further includes AND gate 602 and DAC 608. AND gate 602 is arranged to receive DAC_zero signal 606 and enable signal 110 as inputs. DAC 608 is arranged to receive the output of AND gate 602.

DAC 608 includes NOT gate 810, current source 806, switch 808, switch bank 812, FET 814, switch 816, a cascade of P-FETs 818. For simplification purpose, portions in circuit 800 that are same as portions in circuit 300 are not going to be discussed.

In operation, when DAC_zero signal 606 is in a high state and enable signal 110 is in a high state, the output of AND gate 602 is additionally high. When DAC_zero signal 606 is in a low state and enable signal 110 is in a high state, the output of AND gate 602 is additionally low. When enable signal 110 is in a low state, the output of AND gate 602 is additionally low.

When the output of AND gate 602 is high, NOT gate 810 provides a low signal to switch 816 thereby keeping switch 816 open. Further, when the output of AND gate 602 is high, switch 808 is closed, which connects current source 806 to FET 814. FET 814 acts as an input leg of a current mirror, wherein each of the P-FETs in cascade of P-FETs 818 act as opposing legs in corresponding current mirrors. Digital input signal 111 determines which switches of switch bank 812 are to be activated, to thereby enable operable of corresponding P-FETs in cascade of P-FETs 818, which in turn set the value of analog signal 112. Circuit 800 will then operate as the same manner as in circuit 300 of FIG. 3.

When the output of AND gate 602 is low, switch 808 is open, which disconnects current source 806 from FET 814. Further, when the output of AND gate 602 is low, NOT gate 810 provides a high signal to switch 816 thereby closing switch 816. In this situation, because cascade of P-FETs 818 are disconnected from current source 806, DAC 608 fails to draw current. It is this aspect of the present invention that is beneficial in instances when LED 108 is not ON, which will be described in more detail below.

Figure 9:
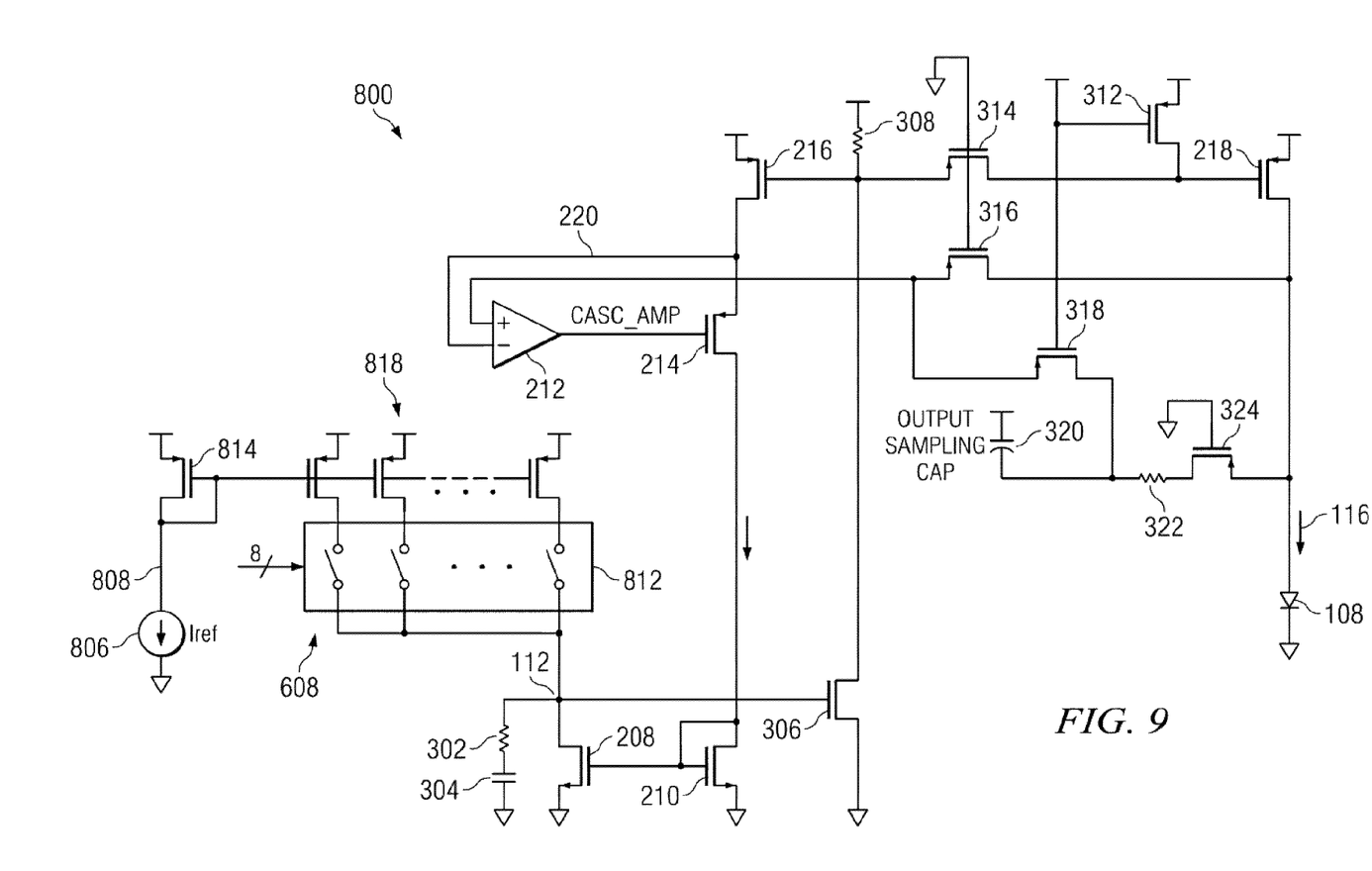
FIG. 9 illustrates an exemplary LED driver circuit in accordance with an aspect of the present invention when the PWM signal is high.

FIG. 9 illustrates LED driver circuit 800 of FIG. 8 when DAC_zero signal 606 is in a high state. In this situation, circuit 800 operates the same way as conventional LED driver circuit 300 in FIG. 3, when PWM signal 114 is high, e.g., LED 108 is ON.

Figure 10:
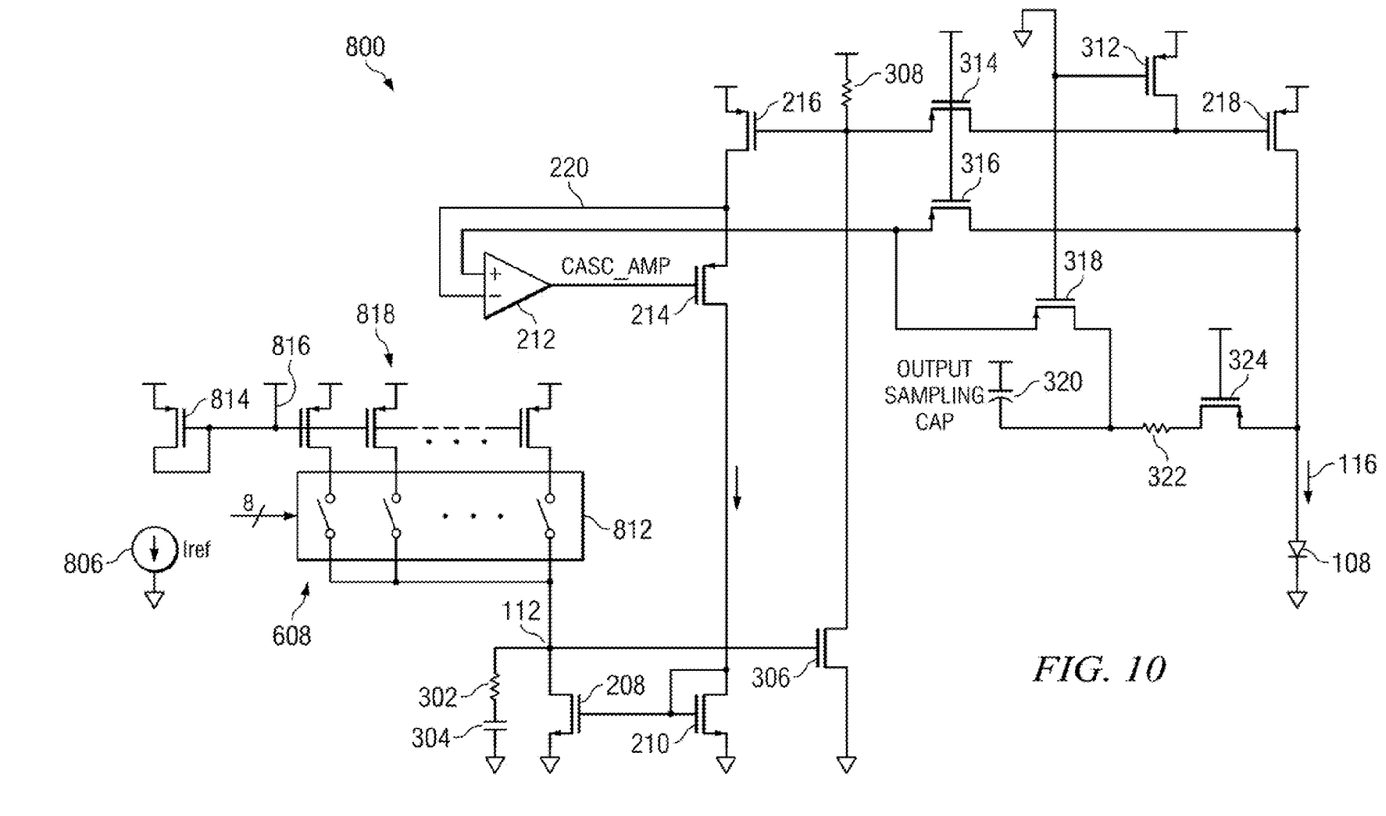
FIG. 10 illustrates an exemplary LED driver circuit in accordance with an aspect of the present invention when the PWM signal is low.

FIG. 10 illustrates LED driver circuit 800 of FIG. 8 when DAC_zero signal 606 is in a low state. Circuit 800 in FIG. 10 illustrates current source 806 being disconnected from FET 814. Cascade of P-FETs 818 is turn off because the source and gates of each FET of cascade of P-FETs 818 are connected to the same supply voltage. In other words, DAC 608 in FIG. 10 is disabled such that no current flows from DAC 608. On the other hand, P-FET 312 is turned on, which results in P-FET 218 being in an OFF state. Because P-FET 218 is OFF, no current passes to LED 108. Thus LED 108 is shut down.

In accordance with an aspect of the present invention, when PWM signal 114 is low so as to turn off LED 108, DAC 608 will be disabled using DAC_zero signal 606. Referring to FIG. 10, if DAC 608 is turned off, it will not output any current into ground through FET 208 of current mirror 202. By preventing current from flowing into ground from DAC 608 when the PWM signal 114 is low, the power consumption of a LED driver circuit in accordance with the present invention will greatly decrease below that of the conventional LED driver circuits. This aspect will be described in more detail below with reference to FIGS. 11 and 12.

Figure 11:
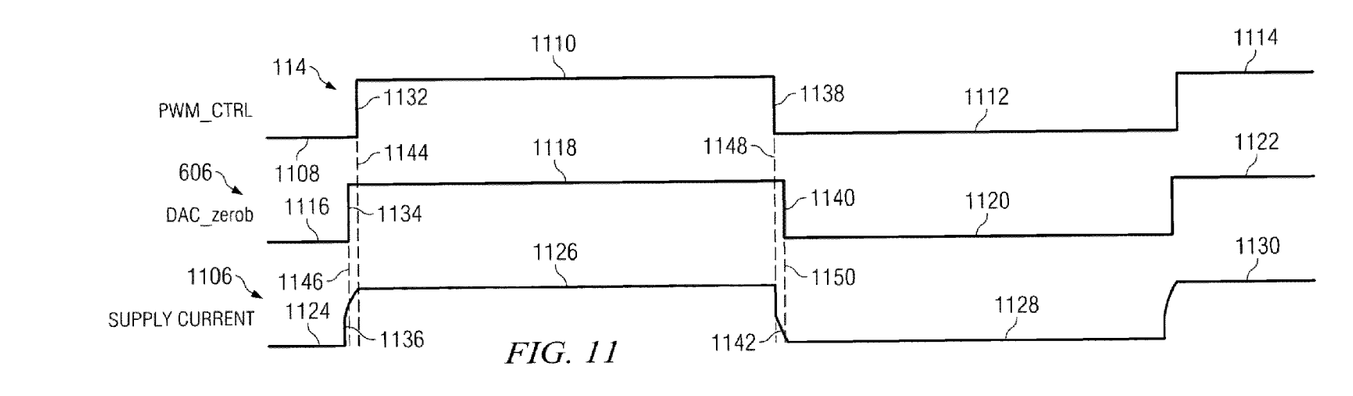
FIG. 11 illustrates the waveform of a PWM control signal with a 50% duty cycle versus the DAC_zero signal and supply current signal.

FIG. 11 illustrates waveform of PWM signal 114 with a 50% duty cycle, DAC_zero signal 606 and supply current signal 1106. PWM signal 114 includes low portions 1108 and 1112 and high portions 1110 and 1114. DAC_zero signal 606 has low portions 1116 and 1120 and high portions 1118 and 1122. Supply current signal 1106 includes low portions 1124 and 1128 and high portions 1126 and 1130. Portions 1132, 1134, and 1136 are the rising edges of PWM signal 114, DAC_zero signal 606, and supply current signal 1106, respectively. Portions 1138, 1140, and 1142 are the falling edges of PWM signal 114, DAC_zero signal 606, and supply current signal 1106, respectively.

As illustrated in the figure, when PWM signal 114 is high, DAC_zero signal 606 and supply current signal 1106 are also high. This represents the operation period when LED is turned on, which corresponds to the LED diver circuit in FIG. 9. One should know that the first rising edge 1134 of DAC_zero signal is before the first rising edge 1132 of PWM_CTRL signal as represented by line 1144. In operation, this means DAC_zero signal 606 enables DAC 608 before PWM signal 114 starts going high. Referring back to FIG. 6, DAC_zero signal 606 ensures that driver 106 has started up before a pulse from PWM signal 114 arrives. In some cases, PWM signal 114 cannot itself be used to shut down DAC 608 or other devices in the driver circuit because the driver circuit may need time to start before the PWM rising edge arrives, especially when the duty cycle is small. Such a situation may violate the linearity requirement of the circuit and cause it to function improperly.

Referring back to FIG. 11, low portions 1112, 1120, and 1128 illustrate that when PWM signal 114 is low, DAC_zero signal 606 and supply current signal 1106 are also low. This represents the operation period when LED 108 is turned off. Keeping supply current 1106 of during portions 1124 and 1128 greatly reduces quiescent current. As such, a LED driving circuit in accordance with the present invention consumes much low power overall, as compared to the conventional LED driving circuits.

Figure 12:
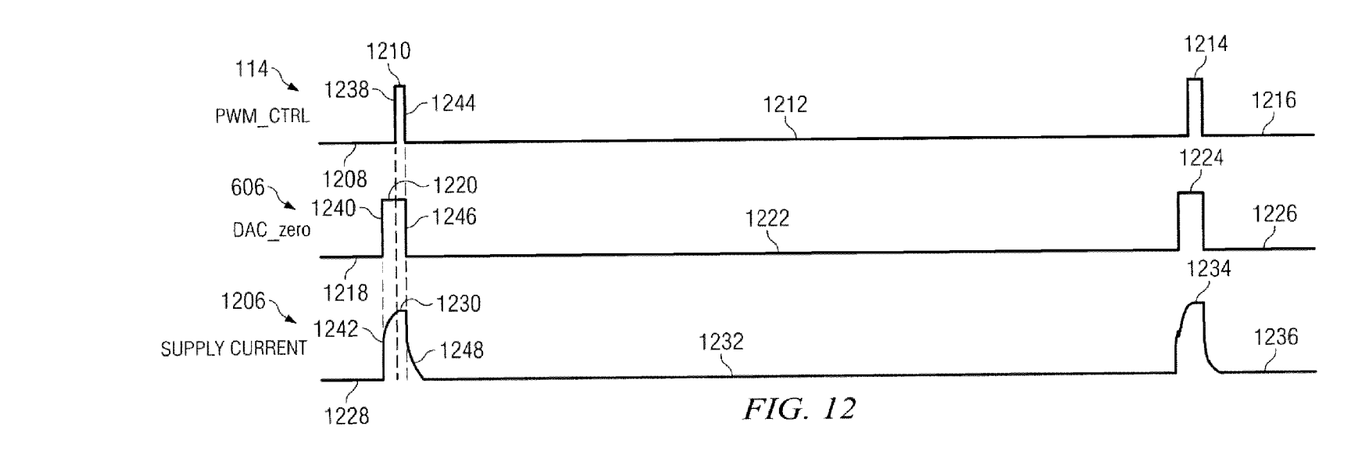
FIG. 12 illustrates the waveform of a PWM control signal with a $\frac{1}{256}^{th}$ duty cycle versus the DAC_zero signal and supply current signal.

FIG. 12 illustrates waveform of PWM signal 114 with a $1/256^{th}$ duty cycle, DAC_zero signal 606 and supply current signal 1206. As illustrated in the figure, PWM signal 114 includes low portions 1208, 1212 and 1216 and high portions 1210 and 1214. DAC_zero signal 606 has low portions 1218, 1222 and 1226 and high portions 1220 and 1224. Supply current signal 1206 includes low portions 1228, 1232 and 1236 and high portions 1230 and 1234.

FIG. 12 is similar to FIG. 11 except the duty cycle for each corresponding signal is much smaller. Referring to FIG. 12, low portion 1212 of PWM signal 114 accounts for more than 99% of a cycle. In a conventional design, for example as illustrated in FIG. 5, a DAC remains in an ON state even when LED 108 is only ON for about $1/256^{th}$ of a cycle. Accordingly, most of the energy is wasted by drawing the supply current into ground. However, as illustrated in FIG. 12, in accordance with the present invention, portion 1232 of supply current 1206 is also in a low state for most of the duty cycle. This is accomplished by having DAC_zero signal 606 be in a low state when PWM signal 114 is in a low state.

The DAC_zero signal provided in the embodiments discussed above, may not be needed in some cases. For example, in cases when the LED driver circuit operates with a 100% duty cycle, or close to 100%, the OFF state of the PWM signal will be extremely small. In these situations, there is not much time to use the DAC_zero signal. An example system and method for programmable generating the DAC_zero signal will now be discussed with reference to FIGS. 13-15.

Figure 13:
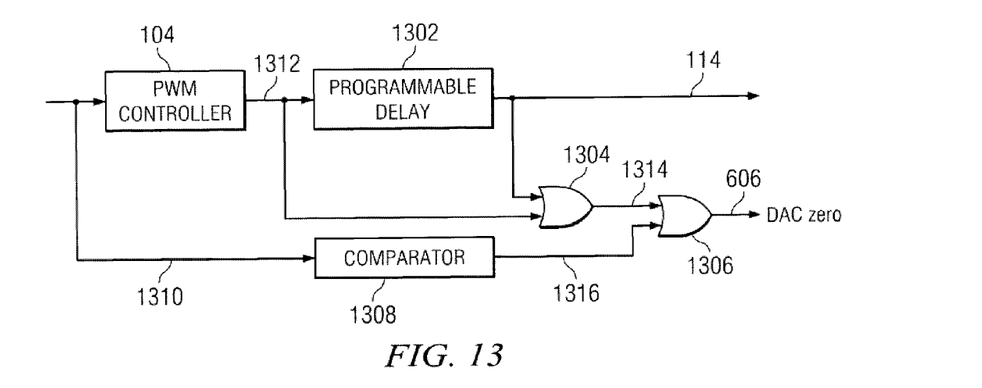
FIG. 13 illustrates an example circuit for programmably generating the DAC_zero signal in accordance with an aspect of the present invention.

FIG. 13 illustrates an example circuit for programmably generating the DAC_zero signal in accordance with an aspect of the present invention. As illustrated in the figure, a programmable delay 1302, an OR gate 1304, a comparator 1308 and an OR gate 1306 are associated with PWM controller 104. An input signal 1310 determines the pulse width, i.e., the duty cycle, and is provided to PWM controller 104 and to comparator 1308. PWM controller provides an output signal 1312 to programmable delay 1302 and OR gate 1304. Programmable delay 1302 provides a programmable time delay to input signal 1312 so as to generate PWM signal 114. OR gate 1304 generates an output signal 1314 as the Boolean product of output signal 1312 OR PWM signal 114. Comparator 1308 provides an output signal 1316 based on whether the duty cycle of input signal 1310 is greater than a programmable width setting (logic 1 when the duty cycle of signal 1310 is greater than the programmable width setting, logic 0 otherwise). OR gate 1306 generates DAC_zero signal 606 as a Boolean product of output signal 1316 OR output signal 1314.

Operation of the circuit illustrated in FIG. 13, in the case where the pulse width of input signal 1310 is smaller than a programmed width setting, will now be described with additional reference to FIG. 14. In such a case in accordance with an aspect of the present invention, the DAC_zero signal 606 will be enabled.

Figure 14:
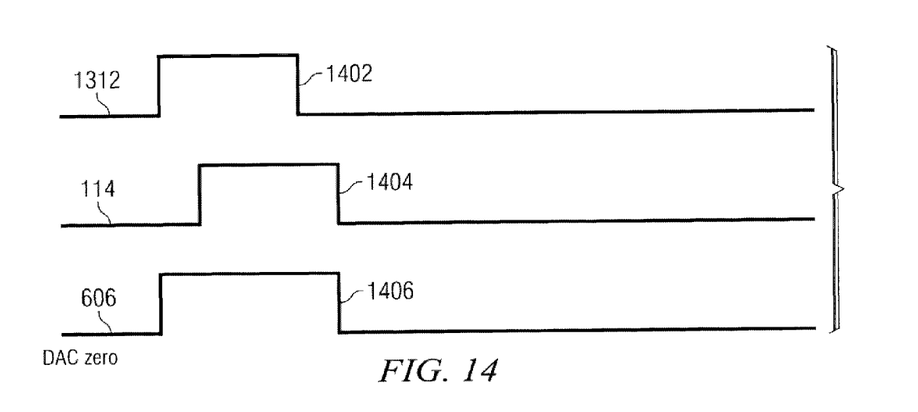
FIG. 14 illustrates example pulse signals within portions of the circuit of FIG. 13.

FIG. 14 illustrates example pulse signals. In the figure, input signal 1310 includes a pulse 1402 having a pulse width that is smaller than a programmed width setting within comparator 1308. Programmable delay 1302 provides a predetermined delay into input signal 1312, thereby generating PWM signal 114. As illustrated in the figure, PWM signal 114 includes a pulse 1404 having the same pulse width as pulse 1402. In this case, as pulse 1402 has a pulse width that is smaller than the programmed width setting within comparator 1308, comparator 1308 is designed so as to provide output signal 1316 as a logic low. When output signal 1316 is a logic low, DAC_zero signal 606 is controlled by input signal 1314 of OR gate 1306. As such, DAC_zero signal 606 is the Boolean product of PWM signal 114 OR input signal 1312. As illustrated in the figure, DAC_zero signal 606 includes a pulse 1406 comprised of the Boolean product of pulse 1402 and pulse 1404.

Operation of the circuit illustrated in FIG. 13, in the case where the pulse width of input signal 1310 from PWM controller 104 is larger than a programmed width setting, will now be described with additional reference to FIG. 15. In such a case in accordance with an aspect of the present invention, the DAC_zero signal 606 will not always be enabled (e.g., when DAC_zero signal 606 is logic 1).

Figure 15:
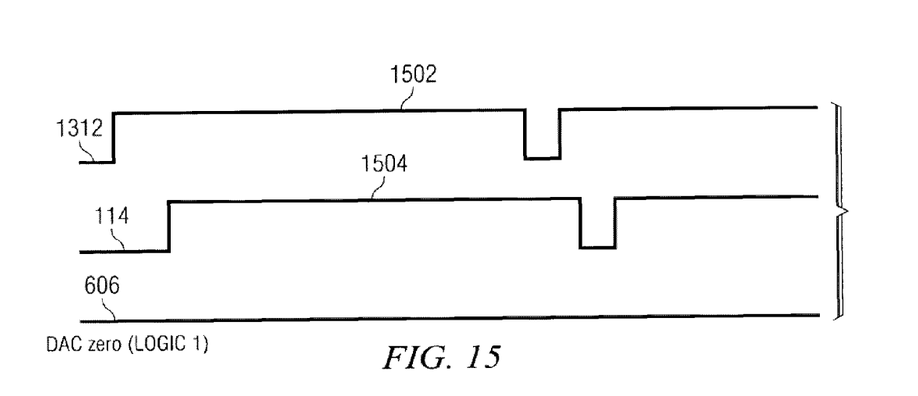
FIG. 15 illustrates additional example pulse signals within portions of the circuit of FIG. 13.

FIG. 15 illustrates example pulse signals. In the figure, input signal 1312 includes a pulse 1502 having a pulse width that is larger than a programmed width setting within comparator 1308. Programmable delay 1302 provides a predetermined delay into input signal 1312, thereby generating PWM signal 114. As illustrated in the figure, PWM signal 114 includes a pulse 1504 having the same pulse width as pulse 1502. In this case, as pulse 1502 has a pulse width that is larger than the programmed width setting within comparator 1308, comparator 1308 is designed so as to provide output signal 1316 as a logic high. When output signal 1316 is a logic high, DAC_zero signal 606 is constantly a logic high. As illustrated in the figure, DAC_zero signal 606 includes a constant logic high signal.

In light of the above discussion with respect to FIGS. 13-15, in accordance with an aspect of the present invention, the DAC_zeroing is not used. Specifically, in cases the pulse width of the input signal is larger than a predetermined programmed width setting, the 'DACzeroing' of the DAC is no longer used.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A circuit for driving a light source, said circuit comprising:
   an input signal provider portion operable to provide a DACzero input signal having a frequency and a DACzero input signal duty cycle including a DACzero input signal high portion and a DACzero input signal low portion;
   an enabling signal providing portion operable to provide an enabling signal having the frequency and an enabling signal duty cycle including an enabling signal high portion and an enabling signal low portion, the enabling signal duty cycle being larger than the DACzero input signal duty cycle;
   a digital-to-analog converter operable to receive a digital input signal and to generate an analog signal based on the DACzero input signal, the enabling signal and the digital input signal; and a driving portion operable to generate a driving signal to drive the light source, the driving signal being based on the analog signal.

2. The device of claim 1, further comprising:
a pulse-width-modulation controller operable to provide a pulse-width-modulation signal,
wherein said driving portion is operable to generate the driving signal based additionally on the pulse-width-modulation signal.

3. The device of claim 1, further comprising an AND gate arranged to receive the DACzero input signal and the enabling signal.

4. The device of claim 3, wherein said digital-to-analog converter is arranged to receive a signal output from said AND gate.

5. The device of claim 1, wherein said driving portion comprises a current mirror.

6. The device of claim 5, wherein said current mirror comprises a first FET and a second FET.

7. The device of claim 6,
wherein said first FET comprises a source, a gate and a drain, and
wherein said drain is arranged to receive the analog signal.

8. The device of claim 5, wherein said driving portion further comprises a current control feedback portion.

9. The device of claim 8,
wherein said current control feedback portion includes a cascade amplifier and a FET,
wherein said cascade amplifier has a first input, a second input and an output,
wherein said first input is arranged to receive the driving signal,
wherein said second input is arranged to receive an analog-based signal that is based on the analog signal,
wherein said cascade amplifier is operable to output, from said output, an amplified output signal based on a difference between the driving signal and the analog-based signal,
wherein said FET comprises a source, a gate and a drain, and
wherein said gate is arranged to receive the amplified output signal.

10. The device of claim 8, further comprising a second current mirror.

11. A circuit for driving a light source, said circuit comprising:
a DACzero input signal provider portion operable to provide a DACzero input signal having a frequency and a DACzero input signal duty cycle including a DACzero input signal high portion and a DACzero input signal low portion;
an enabling signal providing portion operable to provide an enabling signal having the frequency and an enabling signal duty cycle including an enabling signal high portion and an enabling signal low portion, the enabling signal duty cycle being larger than the DACzero input signal duty cycle;
a digital-to-analog converter operable to receive a digital input signal and to generate an analog signal based on the digital input signal and a Boolean AND of the input signal high portion and the enabling signal high portion; and a driving portion comprising a current mirror and a current control feedback portion including a cascade amplifier and a FET, said driving portion being operable to generate a driving signal based on the analog signal, said cascade amplifier having a first input, a second input and an output, said first input being arranged to receive the driving signal, said second input being arranged to receive an analog-based signal that is based on the analog signal, said cascade amplifier being operable to output, from said output, an amplified output signal based on a difference between the driving signal and the analog-based signal, said FET comprising a source, a gate and a drain, said gate being arranged to receive the amplified output signal.

12. The device of claim 11, further comprising:
a pulse-width-modulation controller operable to provide a pulse-width-modulation signal,
wherein said driving portion is operable to generate the driving signal based additionally on the pulse-width-modulation signal.

13. The device of claim 11, further comprising an AND gate arranged to receive the DACzero input signal and the enabling signal.

14. The device of claim 13, wherein said digital-to-analog converter is arranged to receive a signal output from said AND gate.

15. The device of claim 11, wherein said current mirror comprises a first FET and a second FET.

16. The device of claim 15,
wherein said first FET comprises a source, a gate and a drain, and
wherein said drain is arranged to receive the analog signal.

17. The device of claim 11, further comprising a second current mirror.

18. A method of driving a light source, said method comprising:
providing a DACzero input signal having a frequency and a DACzero input signal duty cycle including a DACzero input signal high portion and a DACzero input signal low portion;
providing an enabling signal having the frequency and an enabling signal duty cycle including an enabling signal high portion and an enabling signal low portion, the enabling signal duty cycle being larger than the DACzero input signal duty cycle;
providing a digital input signal;
generating an analog signal based on the digital input signal, the DACzero input signal and the enabling signal; and
generating the driving signal based on the analog signal.

19. The method of claim 18, wherein said generating an analog signal based on the digital input signal, the DACzero input signal and the enabling signal comprises generating the analog signal based on the digital input signal and a Boolean AND of the DACzero input signal and the enabling signal.

20. The method of claim 19, further comprising:
feeding-back the driving signal to an input of an amplifier; and
outputting an amplified signal from the amplifier,
wherein said generating the driving signal based on the analog signal comprises generating the driving signal based on the analog signal and the amplified signal.

* * * * *